United States Patent Office 3,840,527
Patented Oct. 8, 1974

3,840,527
HALOALKYLSULFONAMIDO-SUBSTITUTED TOLAN AND STILBENE COMPOUNDS
George G. I. Moore, Birchwood, and Ronald J. Trancik, White Bear Lake, Minn., assignors to Riker Laboratories, Inc., Northridge, Calif.
No Drawing. Filed Aug. 16, 1971, Ser. No. 172,261
Int. Cl. C07c 143/174
U.S. Cl. 260—240 CA        15 Claims

ABSTRACT OF THE DISCLOSURE

Haloalkylsulfonamido-substituted tolan and stilbene compounds in which two benzene rings are linked by a vinylene or a divalent acetylene radical and one of the benzene rings must contain a haloalkylsulfonamido group which is substituted on the nitrogen by either hydrogen, a cation, cyano, lower alkylsulfonyl, lower fluoroalkylsulfonyl or the group

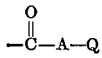

wherein A is oxygen, or a carbon-carbon bond, Q is a lower alkyl and the benzene rings are optionally substituted. These compounds are active as anti-inflammatory agents and some are also active as analgesics, herbicides and anti-microbial agents. Processes for the preparation and methods of using the compounds are described.

---

Haloalkylsulfonamido-substituted tolan and stilbene compounds in which two benzene rings are linked by a vinylene or a divalent acetylene radical and one of the benzene rings must contain a halolakylsulfonamido group which is substituted on the nitrogen by either hydrogen, a cation, cyano, lower alkylsulfonyl, lower fluoroalkylsulfonyl or the group

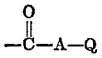

wherein A is oxygen, or a carbon-carbon bond, Q is a lower alkyl and the benzene rings are optionally substituted. These compounds are active as anti-inflammatory agents and some are also active as analgesics, herbicides and anti-microbial agents. Processes for the preparation and methods of using the compounds are described.

It is an object of the invention to provide compounds which are anti-inflammatory agents.

It is an object of the invention to provide compounds which are analgesic agents.

It is an object of the invention to provide compounds which are anti-microbial agents.

It is an object of the invention to provide compounds which modify the growth of plants, i.e., which prevent, alter, destroy or otherwise affect the growth of plants.

It is a further object of the invention to provide a method for controlling inflammation in mammalian tissue.

It is a further object of the invention to provide a method for relieving pain.

It is the further object of the invention to provide a method for controlling micro-organisms.

It is a further object of the invention to provide a method for controlling unwanted plants.

It is still another object of the invention to provide anti-inflammatory compositions containing one or more haloalkylsulfonamido-substituted tolans or stilbenes as active ingredients therein.

It is still another object of the invention to provide analgesic compositions containing one or more haloalkylsulfonamido-substituted tolans or stilbenes as active ingredients therein.

It is still another object of the invention to provide anti-microbial compositions containing one or more haloalkylsulfonamido-substituted tolans or stilbenes as active ingredients therein.

It is still another object of the invention to provide plant growth modifying compositions containing one or more haloalkylsulfonamido-substituted tolans or stilbenes as active ingredients therein.

Still other objects will be made apparent by the following specification.

DETAILED DESCRIPTION OF THE INVENTION

According to the present invention, there is provided a class of compounds of the formula

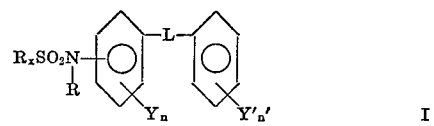

wherein $R_x$ is a haloalkyl group of one to four carbon atoms containing at least one halogen bonded to the alpha carbon atom or at least two halogens bonded to the beta carbon atom (i.e. the carbon atoms alpha and beta to the sulfonyl group in the formula), R is hydrogen, a pharmaceutically acceptable cation, cyano, alkylsulfonyl of one to four carbon atoms, fluoroalkylsulfonyl of one or two carbon atoms or the acid group

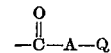

wherein A is oxygen (—O—), or a carbon-carbon bond and Q is a lower alkyl group (preferably containing from one to four atoms), Y and Y' are independently chosen from halogen, alkyl or alkoxy of one to three carbon atoms each and hydroxy or $Y_n$ may be methylenedioxy, $n$ and $n'$ are independently zero, one or two and L is vinylene (—CH=CH—), methyl vinylene $$(-CCH_3=CH-)$$

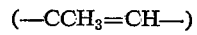

or diavalent acetylene (—C≡C—), provided that when R is cyano, Y and Y' are not amino or hydroxy.

$R_x$ can be a straight or branched chain haloalkyl radical, and the halogen therein can be fluorine and/or chlorine, preferably fluorine. As noted previously, $R_x$ should have at least one halogen bonded to the alpha carbon atom, or, if there is no halogen bonded to the alpha carbon atom, at least two halogens bonded to the beta carbon atom. The haloalkyl radicals may contain only one type of halogen, or the halogens may be mixed. When they are mixed it is preferable to have one or more fluorine atoms per halogen other than fluorine. Most preferred are compounds wherein $R_x$ is trifluoromethyl or difluoromethyl since these are generally most active as anti-inflammatory agents.

The compounds of the invention are acidic in nature when R is hydrogen (such compounds are sometimes referred to herein as acid form compounds). Consequently, they form salts, i.e., compounds of Formula I wherein R is a pharmaceutically acceptable cation. These are generally alkali metal (e.g. lithium, sodium and potassium), alkaline earth metal (e.g. barium, calcium and magnesium), other metal (e.g. aluminum, zinc and iron), ammonium and amine salts. The amine salts include the salts of aliphatic (e.g. alkyl) and aromatic amines, primary, secondary and tertiary.

The compounds of the invention wherein R is hydrogen (the acid form compounds) or a pharmaceutically acceptable cation are generally active as anti-inflammatory agents and make up a preferred class.

Since many of the salts are water soluble, they are often used in the form of aqueous solutions. Also, they can be used in making pharmaceutical preparations in the form of capsules for oral administration.

Compounds wherein R is cyano, alkylsulfonyl, fluoroalkylsulfonyl and the group

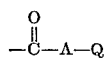

as defined above are generally less active than the corresponding compounds wherein R is hydrogen or a pharmaceutically acceptable cation, but are generally less toxic to mammalian species. It is theorized that the active species is the compound wherein R is hydrogen and other R groups are converted to give the active species *in vivo*, although the invention is in no way limited by this theory. If a compound wherein R is other than hydrogen has a better therapeutic ratio ($LD_{50}/ED_{35}$) than the analogous compound wherein R is hydrogen, this compound may be preferred for therapeutic treatment.

When Y or Y' is alkyl or alkoxy it is preferable that each such group contains one or two carbon atoms. When Y or Y' is halogen it is preferably fluorine or chlorine. When Y or Y' is hydroxy or amino it is preferred that there is no other Y or Y' substitute on the same ring (i.e. the value of $n$ or $n'$ on that ring is one). Compound wherein $n$ and $n'$ are zero also constitute a preferred class.

In Formula I, L is preferably vinylene, since such compounds generally have higher anti-inflammatory activity. In these compounds, which are substituted stilbenes, the stereochemical orientation of the benzene rings about the double bond is preferably trans.

Generally to produce the compounds of Formula I wherein R is a hydrogen atom, an aniline derivative of Formula II is condensed with a haloalkanesulfonylhalide or anhydride according to the following scheme:

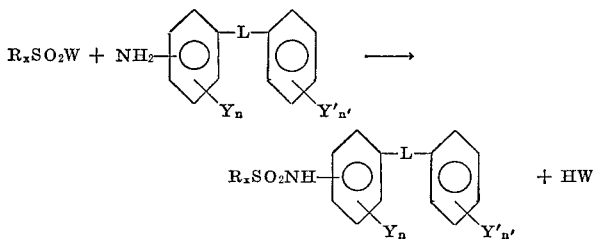

wherein $R_x$, Y, Y', $n$, $n'$ and L are as previously defined and W represents a halogen atom, preferably fluorine or chlorine, or the corresponding anhydride grouping,

Approximately equivalent amounts of the reactants are brought together at temperatures most often ranging between about $-15$ and $150°$ C. If necessary or desirable, the reaction can be carried out in a pressure vessel. The reaction is preferably, but not necessarily, carried out in the presence of an acid acceptor such as an alkaline earth or alkaline metal carbonate or bicarbonate or a tertiary amine such as pyridine, triethylamine, or N,N-dimethylaniline. The amount of the acid acceptor can be varied widely; however, a 10 mole percent excess of that amount of base sufficient to bind the liberated strong acid (HW) is routinely employed.

The condensation is usually conducted in the presence of an appropriate inert organic solvent. Typical solvents suitable for this purpose are methylene chloride, chloroform, carbon tetrachloride, benzene, toluene, 1,2-dimethoxyethane, *bis*(2-methoxyethyl)ether, acetonitrile, nitromethane, N,N-dimethylformamide and the like.

After reaction is complete, if the reaction solvent is not water miscible, the product mixture can be extracted with a dilute aqueous base solution. The product is usually soluble in the basic aqueous layer and is precipitated therefrom by addition of a mineral acid such as hydrochloric or sulfuric acid, and collected by filtration. Alternatively, the product mixture can be washed with aqueous hydrochloric acid, the solvent evaporated *in vacuo*, and the residue dissolved in a dilute aqueous base solution which is washed with dichloromethane and treated with decolorizing charcoal. The product at this point is in the form of a salt and is isolated as the free acid as described above.

If the reaction solvent is water miscible, the product is generally obtained by dilution of the reaction mixture with water. The product, a solid or oil, is separated and purified by conventional methods. The compounds prepared according to the foregoing procedures may be crystalline solids, distillable liquids or oils. Many of the oils are preferably purified as salts. The solids are purified, generally, by recrystallization from aqueous alcohol, trichloroethylene, hexane, benzene-hexane mixtures and the like. Elution chromatography has also been found to be a useful purification technique.

Compounds of Formula I wherein R is hydrogen and L is vinylene can also be prepared by selective reduction (using methods well known to the art, such as palladium on barium sulfate and other catalytic methods) of the comparable compounds of Formula I wherein L is divalent acetylene. In addition, intermediate compounds of Formula II wherein L is divalent acetylene can be reduced to give the corresponding intermediates wherein L is vinylene. Still another method for the preparation of the compounds of Formula I wherein R is hydrogen and L is vinylene is by the condensation of haloalkylsulfonamidobenzaldehydes with benzyl Grignard reagents as follows:

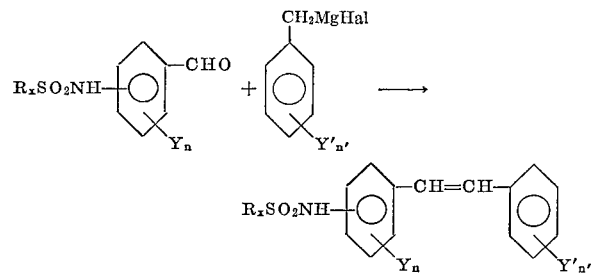

wherein Hal is chlorine or bromine and $R_x$, Y, Y', $n$ and $n'$ are as previously defined.

The salts of the invention are readily prepared by adding the stoichiometric amount of the selected base in inert solvent solution (aqueous or nonaqueous) to the acid form compound. The resulting solution is treated to remove the solvent, e.g. by evaporation under reduced pressure, to obtain the salt, usually as a dry powder. Appropriate bases for use in preparing the metal salts include metal oxides, carbonates, hydroxides, bicarbonates and alkoxides. The organic amine salts and the ammonium salts can be prepared by reacting the acid form with the appropriate organic base or ammonium hydroxide. Some salts are also prepared by cation exchange reactions (by reacting of a salt of the invention with an organic or inorganic salt in a cation exchange reaction).

In order to prepare the compounds of the invention wherein R is cyano, alkylsulfonyl, fluoroalkylsulfonyl or

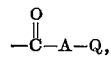

corresponding compounds of Formula I wherein R is a metal ion (for example sodium or potassium) or hydrogen are reacted with a suitable reagent. Thus, the compounds of Formula I in which R is fluoroalkylsulfonyl or alkylsulfonyl are prepared by reacting the corresponding compounds of the invention wherein R is a cation such as sodium or potassium with a fluoroalkanesulfonyl chloride or an alkanesulfonyl chloride and compounds of the invention wherein R is a

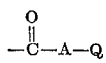

are prepared by reacting the corresponding compounds wherein R is a cation with an acylating agent of the formula

   III wherein A and Q are as defined hereinabove and D is halogen, preferably fluorine, chlorine or bromine, or the residue of an anhydride, i.e. an acyloxy group. A wide variety of acylating agents of Formula III can be used in preparing the compounds of the invention, including acyl halides or anhydrides, haloformates, and the like. These compounds are either available directly, or in the case of certain chloroformates are easily prepared from phosgene and the appropriate alcohol. Included among these compounds are for example, acetyl chloride, n-butyl chloride, acetic anhydride, ethyl chloroformate and the like.

Compounds of the invention wherein R is cyano are prepared by reacting the corresponding compounds of the invention wherein R is a cation such as sodium or potassium with cyanogen chloride or bromide in a non-reactive solvent.

Compounds of the invention wherein Y or Y' are hydroxy may be prepared, and in most cases are preferably prepared, by reaction of other compounds of the invention. Compounds wherein Y or Y' is hydroxy are prepared by cleavage of the alkoxy group in the corresponding compound in which the Y or Y' is alkoxy. This can be done conveniently by reaction of compounds of Formula I wherein Y or Y' is alkoxy with hydrogen iodide-acetic acid mixtures.

Haloalkanesulfonyl anhydrides and halides useful as starting materials in these procedures are known to the art, for example:

difluoromethanesulfonyl chloride,
2,2,2-trifluoroethanesulfonyl chloride,
1,1,2,2-tetrafluoroethanesulfonyl chloride,
2-hydroperfluoropropanesulfonyl chloride,
trifluoromethanesulfonic anhydride,
chloromethanesulfonyl chloride,
chlorofluoromethanesulfonyl chloride, and many others, for example those disclosed in U.S. Pat. 2,732,398 and the Journal of the Chemical Society (London), 3058 (1960).

The intermediate compounds of the invention of Formula II are generally known to the art, and specific intermediates not known are prepared by methods known to the art.

As noted previously, the compounds of the invention are as a class active anti-inflammatory agents, although some are more active than others. The anti-inflammatory activity can be conveniently demonstrated using assays designed to test the ability of these compounds to antagonize local edema, which is a characteristic of the anti-inflammatory response (rat foot edema test), and to inhibit the onset of the erythematous manifestation of inflammation (guinea pig erythema test).

These are standard assays well-known to those skilled in the art. They are described in journals and other publications. Leading references to the rat foot edema test are:

(1) Adamkiewicz et al., Canad. J. Biochem. Physic., *33*:332, 1955;
(2) Selye, Brit. Med. J., 2:1129, 1949; and
(3) Winter, Proc. Soc. Exper. Biol. Med., *111*:554, 1962.

Leading references to the guinea pig erythema test are:

(1) Wilhelmi, Schweiz. Med. Wsch., *79*:577, 1949; and
(2) Winder et al., Arch. Int. Pharmacodyn., *116*:261, 1958.

The anti-inflammatory activity of various compounds of the invention may be detected by other standard assays known to the art such as the cotton pellet granuloma and adjuvant arthritis tests.

The compounds are administered orally, for example as four percent acacia suspensions, but may also be administered parenterally. Amounts are generally about 1 to 500 mg./kg. of body weight of the mammal to be treated.

Presently preferred compound of the invention, because of very high anti-inflammatory activity, are:

trans-(2-trifluoromethylsulfonamido)stilbene
trans-(4-trifluoromethylsulfonamido)stilbene
trans(3-trifluoromethylsulfonamido)stilbene.

Many of the compounds of the invention are active as anti-microbial agents, particularly those wherein R is hydrogen. Exemplary test organisms against which they are active are *Staphylococcus aureus, Bacillus subtilis, Escherichia coli, Aspergillus niger,* Streptococcus sp., *Mycobacterium tuberculosis, Euglena gracilis* and *Chlorella ellipsoidea.*

Some compounds of the invention are active as herbicides, according to standard screening procedure against several broad-leaf and grass species.

The following examples are given for the purpose of further illustrating the procedures of the present invention, but are not intended, in any way, to be limiting on the scope thereof. Thus, while the majority of the examples relate to compounds in which $R_x$ contains but a single carbon atom, other haloalkyl groups can be substituted in place thereof. Also, although the examples relate for the most part to compounds in the acid form (that is having a hydrogen atom bonded to the sulfonamido nitrogen) it is understood that the salts and compounds of the invention in which R is cyano, alkylsulfonyl, fluoroalkylsulfonyl and acyl are likewise contemplated. All melting points are uncorrected. Boiling points are in degrees centigrade and pressure in millimeters of mercury.

EXAMPLE 1

To a round-bottomed flask containing trans-2-aminostilbene (3.34 g., 17.1 mmole) dissolved in dichloromethane (25 ml.) and triethylamine (2.7 ml., 1.95 g., 19.3 mmole) is added trifluoromethanesulfonic anhydride (2.9 ml., 4.9 g., 17.3 mmole) with stirring and external cooling (ice bath). The mixture is made basic with sodium hydroxide solution, then steam distilled to remove triethylamine and other volatile impurities. The residue is then acidified with hydrochloric acid and the solvent is removed *in vacuo* to give solid trans-2-(trifluoromethylsulfonamido) stilbene which is recrystallized twice from hexane-trichloroethylene to give an analytical sample, m.p. 78–79° C.

|  | Analysis, percent | | |
| --- | --- | --- | --- |
|  | C | H | N |
| Calculated for $C_{15}H_{12}F_3NO_2S$ | 55.1 | 3.7 | 4.3 |
| Found | 55.3 | 3.7 | 4.3 |

EXAMPLE 2

Triethylamine (7.2 g., 0.072 mole), 3-(phenylethynyl) aniline (13.7 g., 0.071 mole) and dichloromethane (250 ml.) under a nitrogen atmosphere are maintained below 20° C. while adding trifluoromethanesulfonic anhydride (20.0 g., 0.071 mole) over 15 minutes by external cooling with an ice-water bath. The reaction mixture is stirred cold for 45 minutes, then stirred at ambient temperature for 2.5 hours. Water (100 ml.) and ten percent hydrochloric acid (50 ml.) are added and stirred for 15 minutes. The mixture is then extracted with dichloromethane, and the organic layer is evaporated *in vacuo* to yield an oil which is stirred overnight in five percent sodium hydroxide solution (150 ml.). This solution is treated with decolorizing charcoal, then acidified and cooled. The solid which separates is dissolved in dichloromethane, dried over magnesium sulfate and recovered by evaporation *in vacuo*, then recrystallized from cyclohexane and hexane to give 3-(phenylethynyl)trifluoromethanesulfonanilide, m.p. 92.5–94° C.

|  | Analysis, percent | | |
| --- | --- | --- | --- |
|  | C | H | N |
| Calculated for $C_{15}H_{10}F_3NO_2S$ | 55.4 | 3.1 | 4.3 |
| Found | 55.9 | 3.3 | 4.2 |

EXAMPLE 3

3 - (phenylethynyl)trifluoromethanesulfonanilide (10.0 g., 30.8 mmole) dissolved in methanol (125 ml.), a mixture of 5 percent palladium on barium sulfate (0.3 g.) and quinoline (0.3 g.) are hydrogenated at about 45 p.s.i. with shaking. Once hydrogen uptake has stopped the mixture is filtered and the filtrate is evaporated *in vacuo* to give an oil whose infrared spectrum is consistent with that expected for cis-(3-trifluoromethylsulfonamido)stilbene. This product is purified by elution chromatography on acid alumina. The product recovered is converted into the triethylamine salt by stirring with excess triethylamine in isopropyl ether and removing the volatile portion *in vacuo*. Recrystallization from isopropanol-isopropyl ether yields solid triethylammonium cis - (3 - trifluoromethylsulfonamido)stilbene, m.p. 63–65° C.

|  | Analysis, percent | | |
| --- | --- | --- | --- |
|  | C | H | N |
| Calculated for $C_{15}H_{12}F_3NO_2S$ | 58.9 | 6.3 | 6.5 |
| Found | 59.1 | 6.2 | 6.4 |

Other compounds of the invention are given in Table I.

TABLE I

| Example number | Compound |
| --- | --- |
| 4 | Trans-(3-trifluoromethylsulfonamido)stilbene. |
| 5 | Cis-(2-trifluoromethylsulfonamido)stilbene. |
| 6 | Trans-2-(chloromethylsulfonamido)stilbene. |
| 7 | Trans-3-(difluoromethylsulfonamido)stilbene. |
| 8 | Trans-2-(fluorochloromethylsulfonamido)stilbene. |
| 9 | Trans-2-(perfluorobutylsulfonamido)stilbene. |
| 10 | Trans-4-(perfluoroethylsulfonamido)stilbene. |
| 11 | Trans-4'-chloro-2-(trifluoromethylsulfonamido)-stilbene. |
| 12 | 4-methoxy-3-(phenylethynyl)trifluoromethanesulfonanilide. |
| 13 | Trans-2',5'-dimethoxy-4-(trifluoromethylsulfonamido)-stilbene.[1] |
| 14 | 4-hydroxy-3-(phenylethynyl)trifluoromethanesulfonanilide. |
| 15 | Trans-(4-trifluoromethylsulfonamido)stibene.[2] |

[1] M.P. 136–137° C.
[2] M.P. 155–156.5° C.

EXAMPLE 16

Trans - 2 - (trifluoromethylsulfonamido)stilbene (5.8 g., 0.018 mole) is dissolved in acetone and stirred with sodium carbonate (10 g., 0.095 mole) for about two hours to give sodium trans-2-(trifluoromethylsulfonamido)stilbene. Ethyl chloroformate (1.4 ml., 0.018 mole) is added and the mixture is stirred overnight. The mixture is filtered and the filtrate is evaporated *in vacuo*. The residue is recrystallized twice from a carbon tetrachloroidehexane mixture to give trans-2-(N-ethoxycarbonyltrifluoromethylsulfonamido)stilbene, m.p. 57–60.5° C.

|  | Analysis, percent | | |
| --- | --- | --- | --- |
|  | C | H | N |
| Calculated for $C_{18}H_{16}F_3NO_4S$ | 54.2 | 4.0 | 3.5 |
| Found | 54.4 | 4.0 | 3.5 |

Other compounds of the invention prepared using the general method of Example 16 are given in Table II.

TABLE II

| Example number | Compound |
| --- | --- |
| 17 | Trans-4-(N-acetyltrifluoromethanesulfonamido)stilbene. |
| 18 | Trans-4-(N-ethoxycarbonyltrifluoromethanesulfonamido)-stilbene. |
| 19 | Trans-3-(N-butoxycarbonyltrifluoromethanesulfonamido)-stilbene. |

EXAMPLE 20

Trans - 3 - (trifluoromethylsulfonamido)stilbene is dissolved in acetone and stirred with excess potassium carbonate to form potassium trans-3-(trifluoromethylsulfonamido)stilbene. An equimolar amount of difluoromethanesulfonyl chloride (0.3 g.) is added and the mixture is stirred overnight. The mixture is filtered, then the filtrate is evaporated *in vacuo*. The residue is washed with water, then dilute sodium hydroxide, then again with water, and finally extracted thoroughly with benzene. The benzene extracts are dried, then evaporated *in vacuo* to give trans-3 - (N-difluoromethylsulfonyltrifluoromethylsulfonamido) stilbene.

Additional compounds prepared according to the method of Example 20 are in Table III.

TABLE III

| Example number | Compound |
| --- | --- |
| 21 | Trans-2-(N-methylsulfonyltrifluoromethylsulfonamido)-stilbene. |
| 22 | Trans-2-(N-fluoromethylsulfonyltrifluoromethyl-sulfonamido)stilbene. |
| 23 | Trans-4-(N-trifluoromethylsulfonyltrifluoromethyl-sulfonamido)stilbene. |

EXAMPLE 24

Trans - 3 - (trifluoromethylsulfonamido)stilbene is dissolved in acetone and stirred with an equimolar amount of sodium hydroxide to form sodium trans-3-(trifluoromethylsulfonamido)stilbene. Solvents are removed by evaporation *in vacuo*. The salt is dissolved in 1,2-dimethoxyethane (glyme) and the solution is cooled with stirring below 10° C. Cyanogen chloride (an equimolar amount) is bubbled into this cold solution, and the solution is stirred overnight at room temperature. The mixture obtained is filtered, and the filtrate is evaporated to obtain the product as a heavy oil, trans-3-(N-cyanotrifluoromethylsulfonamido)stilbene. The infrared spectrum of this sample is consistent with the assigned structure.

EXAMPLE 25

A solution of 6-nitropiperonal (16.7 g., 85 mmole) and the diethyl benzyl phosphinate salt of benzyl chloride (19.5 g., 85 mmole) in glyme are treated under a nitrogen atmosphere with 53 percent sodium hydride in oil (3.9 g., 85 mmole). The mixture is heated at its reflux temperature for one hour, then poured into water (1.2 1.). The solid is separated by filtration and recrystallized several times from ethanol to give trans 2-nitro-4,5-methylenedioxystilbene, m.p. 104–106° C.

|  | Analysis, percent | | |
| --- | --- | --- | --- |
|  | C | H | N |
| Calculated for $C_{15}H_{11}NO_4$ | 66.9 | 4.1 | 5.2 |
| Found | 67.1 | 3.9 | 5.1 |

2-nitro - 4,5-methylenedioxystilbene (10 g., 37 mmole) is dissolved in ethanol and reduced with hydrogen gas in a Parr hydrogenator over platinum on charcoal. The mixture is filtered and evaporated to dryness *in vacuo* to a brown powder,, 2-amino - 4,5 - methylenedioxystilbene, which is used without further purification.

Addition of trifluoromethanesulfonic anhydride (6.5 ml.) to a solution of 2-amino-4,5-methylenedioxystilbene (8.77 g., 32.6 mmole) and triethylamine (5.5 ml.) in dichloromethane gives a rapid reaction. The solvent is evaporated *in vacuo* and the residue treated with hot aqueous sodium hydroxide, then filtered. The solution is acidified, giving a brown solid which is separated by filtration. The product is extracted into dichloromethane and the solution is dried. After repeated recrystallization from ethanol-water mixture and trichloroethylene, trans-2 - trifluoromethanesulfonamido - 4,5-methylenedioxystilbene is obtained as a brown solid, m.p. 168–170° C. (dec.).

|  | Analysis, percent | | |
|---|---|---|---|
|  | C | H | N |
| Calculated for $C_{16}H_{12}F_3NO_4S$ | 51.8 | 3.3 | 3.8 |
| Found | 52.0 | 3.2 | 3.7 |

EXAMPLE 26

To a solution of sodium ethoxide (3.0 g. sodium in 200 ml. of ethanol) is added the triphenylphosphine salt of benzylchloride (38.8 g., 0.10 mole). The resulting yellow slurry is immediately treated with 3-nitroacetophenone (16.5 g., 0.10 mole). After stirring briefly the reaction mixture is evaporated *in vacuo* to remove solvents, the residue is washed with water and then extracted with dichloromethane. The solvent is removed *in vacuo* and the residue treated with carbon tetrachloride. A white residue of triphenylphosphine oxide is removed by filtration. The solution is then chromatographed on neutral alumina, eluting the product with hexane.

The resulting 3 - (1'-phenyl-2'-propenyl)nitrobenzene is reduced without further purification over five percent platinum on charcoal with hydrogen gas in a Parr hydrogenator. Tan solid 3 - (1'-phenyl-2'-propenyl)aniline is recrystallized twice from a hexane-trichloroethylene mixture to give an off-white solid.

|  | Analysis, percent | | |
|---|---|---|---|
|  | C | H | N |
| Calculated for $C_{15}H_{15}N$ | 86.1 | 7.2 | 6.7 |
| Found | 86.0 | 7.4 | 6.5 |

Addition of trifluoromethanesulfonic anhydride (9.0 ml.) to a solution of 3 - (1'-phenyl-2'-propenyl)aniline (11.0 g., 53 mmole) and triethylamine (8 ml.) in dichloromethane gives a rapid reaction. The solvent is evaporated *in vacuo* and the residue treated with excess aqueous sodium hydroxide. The solution is steam distilled until no solid residue remains, then treated with decolorizing charcoal, filtered and finally acidified to give the product as an oil. The product is purified by chromatography on acidic alumina, eluting with benzene and diethyl ether, then recrystallized thrice from hexane to give trans 3 - (1'-phenyl-2'-propenyl)trifluoromethanesulfonanilide, m.p. 67–73° C. The structure of this compound is as follows:

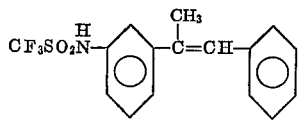

|  | Analysis, percent | |
|---|---|---|
|  | C | H |
| Calculated for $C_{16}H_{14}F_3NO_2S$ | 56.3 | 4.1 |
| Found | 56.5 | 4.3 |

What is claimed is:
1. A compound of the formula:

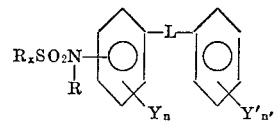

wherein $R_x$ is a perfluoroalkyl group of one to four carbon atoms, R is hydrogen, a pharmaceutically acceptable cation, cyano, alkylsulfonyl of one to four carbon atoms, fluoroalkylsulfonyl of one or two carbon atoms or the group

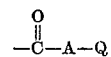

wherein A is oxygen (—O—), or a carbon-carbon bond and Q is a lower alkyl group, Y and Y' are independently chosen from halogen, alkyl or alkoxy of one to three carbon atoms each and hydroxy or $Y_n$ may be methylenedioxy, $n$ and $n'$ are independently zero, one or two and L is vinylene, methyl vinylene or acetylene, provided that when R is cyano, Y and Y' are not hydroxy.

2. A compound according to claim 1 wherein $R_x$ is trifluoromethyl.
3. A compound according to claim 1 wherein R is hydrogen.
4. A compound according to claim 1 wherein R is a pharmaceutically acceptable cation.
5. A compound according to claim 1 wherein $n$ and $n'$ are zero.
6. A compound according to claim 1 wherein L is vinylene.
7. A compound according to claim 6 wherein $n$ and $n'$ are zero.
8. A compound according to claim 1 wherein L is methyl vinylene.
9. A compound according to claim 1 wherein L is acetylene.
10. Trans - (2-trifluoromethylsulfonamido)stilbene according to claim 2.
11. Trans - (3-trifluoromethylsulfonamido)stilbene according to claim 2.
12. Trans - (4-trifluoromethylsulfonamido)stilbene according to claim 2.
13. 3 - (phenylethynyl)-trifluoromethanesulfonanilide according to claim 9.
14. Trans - 2 - trifluoromethanesulfonamido-4,5-methylenedioxystilbene according to claim 2.
15. Trans - 3-(1'-phenyl-2'-propenyl)trifluoromethanesulfonanilide according to claim 8.

References Cited
UNITED STATES PATENTS
| 3,647,874 | 3/1972 | Gerster | 260—556 F |
| 3,661,990 | 5/1972 | Harrington | 260—556 F |

FOREIGN PATENTS
| 70,095 | 12/1969 | East Germany | 260—556 F |
| 738,758 | 10/1955 | England | 260—556 F |
| 1,058,049 | 5/1959 | German Auslegeschrift | 260—556 F |
| 1,188,591 | 3/1959 | France | 260—556 F |

OTHER REFERENCES
Chemical Abstracts, vol. 74, abstracts No. 99643z (1971) (abstract of Ger. Offen. 2,028,843).

JOHN D. RANDOLPH, Primary Examiner

U.S. Cl. X.R.

71—88, 103; 260—556 F, 470; 424—321